United States Patent [19]

Ito et al.

[11] 4,011,151
[45] Mar. 8, 1977

[54] PROCESS FOR PURIFYING WASTE WATER BY ELECTROLYSIS

[75] Inventors: Takuji Ito, Tokyo; Hisao Yamazaki, Machida, both of Japan

[73] Assignee: Nippon Risui Kagaku Kenkyusho, Japan

[22] Filed: July 15, 1975

[21] Appl. No.: 596,158

Related U.S. Application Data

[63] Continuation-in-part of Ser. No. 484,858, July 1, 1974, Pat. No. 3,915,820.

[30] Foreign Application Priority Data

July 6, 1973   Japan ............... 48-76887

[52] U.S. Cl. ............... 204/149; 204/152; 210/24
[51] Int. Cl.² ............ C02B 1/82; C02C 5/12
[58] Field of Search ........... 204/98, 128, 131, 149, 204/152; 210/41, 47, 24

[56] References Cited

UNITED STATES PATENTS

| | | | |
|---|---|---|---|
| 1,219,333 | 3/1917 | Kynaston | 204/152 |
| 3,485,729 | 12/1969 | Hertz | 204/131 |
| 3,691,041 | 9/1972 | Stralser | 204/152 |
| 3,793,174 | 2/1974 | Ichiki et al. | 204/152 X |
| 3,809,631 | 5/1974 | Ohta | 204/152 X |

*Primary Examiner*—Arthur C. Prescott
*Attorney, Agent, or Firm*—Burgess Ryan and Wayne

[57] ABSTRACT

A process for purifying waste water by electrolysis in two steps is disclosed. In the first step, the electrolysis is effected by dipping an iron anode and a carbon cathode in the waste water having a pH of about 7 to be purified until a pH of 11 is reached. The water is filtered to remove the precipitate which has formed. In the second step, the pH of the filtrate having a pH of 11 is adjusted to about 4 by electrolysis with a carbon anode and an aluminum cathode or by adding thereto an acid and then the electrolysis of the filtrate is effected by dipping therein an iron anode and an aluminum or aluminum base alloy cathode. This process may be illustrated by the following diagram:

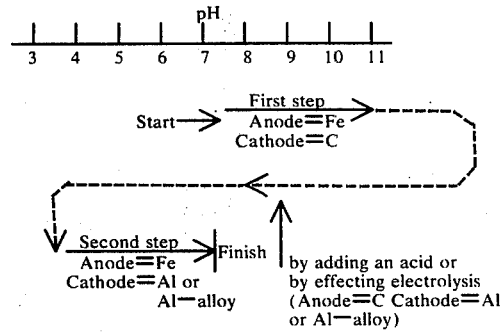

3 Claims, No Drawings

PROCESS FOR PURIFYING WASTE WATER BY ELECTROLYSIS

This is a continuation of application Ser. No. 484,858, filed July 1, 1974 now U.S. Pat. No. 3,915,820.

BACKGROUND OF THE INVENTION

Water pollution is caused by industrial technology. There can be observed many different kinds of waste water, and many different ways of purifying such waste water have been proposed. Many organic or inorganic chemical agents or various processes of electrolysis to for purifying the waste water have been proposed and put into practical use. However, waste water containing dye stuffs is difficult to purify.

It is, therefore, an object of the present invention to provide a process of purifying waste water containing dye stuffs.

SUMMARY OF THE INVENTION

The present invention relates to a process of purifying waste water by electrolysis, and more particularly to a process of purifying waste water containing dye stuffs by carrying out electrolysis in two steps.

The electrolysis of the present invention is characterized in that an iron anode and an aluminum or aluminum base alloy cathode are used at a pH of the waste water that is at a pH of lower than 7, and an iron anode and a carbon cathode are used at a pH of higher than 7 of the waste water, and the electrolysis of the waste water is carried out in two steps at two different pH ranges of the waste water.

The hydrogen ion concentration (pH) of the waste water to be purified is adjusted to about 4 then it is alkaline. In this waste water, an iron anode and an aluminum or aluminum base alloy cathode are dipped, and then the electrolysis is carried out using a current density of about $0.4 A/dm^2$ by applying a D.C. voltage to the electrodes. The D.C. voltage depends on the type of waste water. However, a D.C. voltage of about 15V is suitably used. The aluminum base alloy is one containing at least one metal element selected from the group consisting of copper, iron, zinc and manganese.

As the electrolysis is continued with stirring in the manner as described above, the pH goes up and a precipitate is formed. When the pH reaches about 7, the electrolysis is stopped. The electrolysis to this point is the first step of electrolysis in accordance with the invention.

The precipitate that is formed is removed, for example, by filtration to obtain the precipitate-removed waste water. In this water, an iron anode and a carbon cathode are dipped and the second step of electrolysis is carried out by applying a D.C. voltage to the electrodes in the same manner as that of the first step of electrolysis. As the electrolysis is continued with stirring, a precipitate is formed and the pH goes up. When the pH reaches about 11, the electrolysis is stopped and the precipitate that has formed is removed to obtain the purified water.

The purified waste water having a pH of about 11 is neutralized to a pH of 7 by adding an acid. Alternatively, the neutralization is carried out by dipping a carbon anode and an aluminum base alloy cathode in the purified waste water and carrying out the electrolysis in the same manner as that described above.

The theoretical considerations of purifying waste water according to this invention are as follows:

In the first step of the electrolysis at a pH of lower than 7, an iron anode and an aluminum or aluminum base alloy cathode are used. By carrying out the electrolysis, colloidal iron hydroxide and colloidal aluminum hydroxide are produced. Iron hydroxide is produced by dissolution of the iron anode and aluminum hydroxide is produced as follows: the pH of the waste water adjacent to the cathode reaches about 11 by the electrolysis and aluminum or aluminum base alloy is dissolved in an alkaline solution. The colloidal iron hydroxide and aluminum hydroxide has a positive charge at a pH of lower than 7. The positively charged colloidal hydroxide adheres to the negatively charged particulate matter in the waste water to form a precipitate or a deposit. Further, the positively charged colloidal hydroxide adsorbs the dye stuffs dissolved in the waste water. In the second step of the electrolysis at a pH of higher than 7, the iron anode is gradually dissolved to produce colloidal iron hydroxide, and the latter has a negative charge at a pH of higher than 7 and adheres to the positively charged particulate matter in the waste water to form a precipitate. Further, the negatively charged colloidal iron hydroxide adsorbs the dye stuffs dissolved in the waste water.

When an aluminum base alloy cathode is used instead of an aluminum cathode, the dissolurion of aluminum is facilitated with the aid of copper, iron, zinc or manganese present in the alloy. At the same time, hydroxides of copper, iron, zinc or manganese are produced, and these hydroxides adhere to the particulate material and adsorb the dye stuffs in the waste water.

DESCRIPTION OF THE PREFERRED EMBODIMENTS

The following example is given by way of illustration only and is not intended as limitation of this invention.

EXAMPLE 1

100% of waste water (sample) was obtained from dye works. This waste water was a suspension having a brown-purple color and a pH of about 4, a transparency of 0.8cm and a chemical oxygen demand (COD) of about 380. In this waste water was dipped an iron anode and an aluminum cathode, and the electrolysis was carried out at a temperature of about 25° C, with stirring, using a current density of $0.4 Amp/dm^2$. After the electrolysis was continued for about 20 minutes, the pH of the waste water reached 3.8 and a brownish precipitate was formed. The first step of the electrolysis was stopped and the precipitate was filtered off. The filtrate was light purple in color and had a transparency of 4cm. In this filtrate was dipped an iron anode and a carbon cathode, and the second electrolysis was carried at a temperature of 25° C, with stirring, using a current density of $0.4 Amp/dm^2$. After the electrolysis was continued for about 25 minutes, the pH of the waste water reached 10.5 and a light purplish precipitate was formed. The electrolysis was stopped and the precipitate was filtered off. The filtrate was nearly colorless, and had a transparency of more than 30cm and a COD of about 80.

Waste water containing dye stuffs is usually difficult to purify by a conventional purifying process. Such waste water can be purified by carrying out the electrolysis in two steps according to the present invention.

The waste water having a COD of about 80, which has been treated by the process of the present invention, may be treated with active carbon to lower its COD to about 10. Such purified waste water may then be reused as industrial water.

In the above Example, a process carrying out electrolysis in two steps has been illustrated, in which the first electrolysis is carried out at a pH of lower than 7 by using an iron anode and an aluminum or aluminum base alloy cathode and the second electrolysis is carried out at a pH higher than 7 by using an iron anode and a carbon cathode.

EXAMPLE II

Alternatively, the electrolysis may be carried out as follows:

Waste water to be purified is adjusted to a pH of about 7 and the first electrolysis is carried out by using an iron anode and a carbon cathode. When the pH reaches about 11, the electrolysis is stopped, and the precipitate which has formed is filtered off. The pH of the filtrate is lowered to about 4 by carrying out the electrolysis with a carbon anode and an aluminum cathode or by adding an acid to the filtrate, and then the second electrolysis is carried out by using an iron anode and an aluminum or aluminum base alloy cathode. When the pH reaches about 7, the second electrolysis is stopped, and the precipitate which has formed is filtered off. In this procedure, the first and second steps of the electrolysis are contrary to those as shown in Example I. By using such a procedure, waste water containing dye stuffs can be purified.

We have found that waste water containing heavy metal ions such as copper, iron, manganese, chromium, zinc cadmium and mercury ions can be purified by the process of the present invention. When an aluminum cathode is used, the dissolution of aluminum is facilitated by the or deposition of the heavy metals and the hydroxides of the heavy metals are produced. These hydroxides cohere adhere to the particulate material in the waste water and adsorb dye stuffs contained in the waste water.

Furthermore, anions such as phosphate ion and sulfate ion present in small amounts in the waste water can be removed by the process of the present invention, because colloidal aluminum hydroxide and iron hydroxide adsorb such anions at a pH lower than 7.

We claim:
1. A process of purifying waste water by electrolysis in two steps wherein the first step comprises:
    carrying out said electrolysis of the waste water at a pH of about 7 by dipping an iron anode and a carbon cathode in said waste water to be purified, energizing said electrodes until a pH of 11 is reached, removing the precipitate thus formed; and wherein the second step comprises lowering the filtrate to a pH of about 4 and carrying out a second electrolysis by dipping therein an iron anode and a carbon cathode and energizing said electrodes.
2. A process according to claim 1 wherein in said second step the pH of 4 is obtained by electrolysis with a carbon anode and an aluminum cathode.
3. A process according to claim 1 wherein said pH of 4 in said second step is obtained by adding therein an acid.

* * * * *

UNITED STATES PATENT OFFICE
CERTIFICATE OF CORRECTION

Patent No. 4,011,151              Dated March 8, 1977

Inventor(s) Takuji Ito, et al

It is certified that error appears in the above-identified patent and that said Letters Patent are hereby corrected as shown below:

Column 1, line 5: Change "continuation" to -- continuation-in-part --.

Column 1, line 14: Delete "to".

Column 1, line 36: Change "then" to --when--.

Column 2, line 28: Change "dissolurion" to --dissolution--.

Column 2, line 42: Change "100%" to --100$\ell$ --.

Column 2, line 51: Change "3.8" to --6.8--.

Column 4, line 8: Delete "cohere".

Column 4, line 27: Delete "a carbon cathode"; insert --an aluminum or aluminum base alloy cathode--.

Column 4, line 33: Change "therein" to --thereto--.

Signed and Sealed this twenty-sixth Day of July 1977

[SEAL]

Attest:

RUTH C. MASON
*Attesting Officer*

C. MARSHALL DANN
*Commissioner of Patents and Trademarks*